United States Patent [19]

Ellis et al.

[11] Patent Number: 4,644,525

[45] Date of Patent: Feb. 17, 1987

[54] LINE TRANSMISSION SYSTEMS

[75] Inventors: Christopher W. H. Ellis, Warwickshire; John A. Tritton, London, both of England

[73] Assignee: The General Electric Company, p.l.c., England

[21] Appl. No.: 644,532

[22] Filed: Aug. 27, 1984

[30] Foreign Application Priority Data

Aug. 26, 1983 [GB] United Kingdom ............... 8322992

[51] Int. Cl.⁴ ............................................. H04L 5/14
[52] U.S. Cl. ........................................ 370/29; 370/24
[58] Field of Search ............................ 370/24, 29, 31

[56] References Cited

U.S. PATENT DOCUMENTS

| 3,956,589 | 5/1976 | Weathers et al. | 370/31 |
| 3,974,339 | 8/1976 | Lutz et al. | 370/29 |
| 4,288,868 | 9/1981 | Grotjohann et al. | 370/31 |
| 4,345,325 | 8/1982 | Gandini et al. | 370/29 |
| 4,419,752 | 12/1983 | Sonnenberger et al. | 370/29 |

FOREIGN PATENT DOCUMENTS 1440047 6/1976 United Kingdom .

OTHER PUBLICATIONS

"Half-Duplex to Full-Duplex Asynchronous Adapter Architecture for Fast Turnaround Data Channels", by G. D. Jones, Jr. et al, IBM Tech Bulletin, vol. 21, No. 3, 1978.
"A Digital Transmission System for Multi-Terminal Applications", Clothier, et al, GEC Telecommunications Journal 41, 1980.
"ISDN Network Terminating Equipment", Griffiths, ISSLS 82, Toronto, pp. 45–49.
"Extending the Capabilities of Burst-mode Transmission in the Local Loop", Bylanski & Tritton, ISSLS 82, Toronto, pp. 191–195.

Primary Examiner—Douglas W. Olms
Assistant Examiner—Kenneth I. Rokoff
Attorney, Agent, or Firm—Kirschstein, Kirschstein, Ottinger & Israel

[57] ABSTRACT

In a telephone system in which digitally coded speech or data is transmitted in burst mode between a subscriber's set and the local exchange the bursts may be of the same length in either direction or longer in one direction than the other in dependence upon the information to be transmitted. Binary digit values making up the bursts are assembled for transmission in and held following reception of a shift register, and different output points along the register are selected in dependence upon the length of burst to be transmitted.

2 Claims, 3 Drawing Figures

LINE TRANSMISSION SYSTEMS

The present invention relates to line transmission systems.

In particular, although not exclusively, the invention is concerned with networks which provide interconnections between subscribers' equipment and local exchanges in telephone systems.

Digital switching and data handling equipment is increasingly being used in telephone exchanges to effect the routing of calls and generally to control and monitor operations, and the speech signals transmitted once a call is set up are increasingly being digitally coded for transmission over at least part of the route between the participating subscribers. The widely used practice of sampling a speech signal at a repetition rate of 8 KHz and coding the amplitude of each sample in accordance with an eight-bit compression-law code gives a stream of binary digits at 64 Kbit/sec, and this bit rate has become accepted as characterising a standard digital one way telephone channel.

The combination of digital switching and control with the transmission of telephone speech signals in digitised form provides the digital telephone network with a flexibility not readily available in an analogue network, in that virtually any information capable of being represented in binary digital form can be routed and transmitted throughout the digital part of the network as readily as telephone speech signals, once that information is organised in a suitable format. Such a combination is provided by the Integrated Services Digital Network, which is now coming into use.

One of the problems encountered in extending the facilities of such a network to an individual subscriber is that of utilising the existing line pair connection between the subscriber and the local exchange for the transmission of digitised information.

According to one aspect of the present invention in a line transmission system in which digitally coded information is arranged to be transmitted in burst mode between two stations of the system with each of said two stations in turn transmitting a sequence or burst of pulses to the other station over a common transmission path during each of a succession of frame periods, there are provided means arranged selectively to transmit longer bursts in one direction than in the other direction between said two stations.

Said digitally coded information may include pulse code modulated speech signals.

According to another aspect of the present invention in a line transmission system in which digitally coded information is arranged to be transmitted in burst mode between two stations of the system, there are provided means at each of said stations arranged selectively to transmit and receive either bursts of substantially equal duration during each of a succession of frame periods or to transmit and receive bursts of substantially different duration during each of said frame periods, in dependence upon the information to be transmitted between said two stations.

According to another aspect of the present invention in a telephone system in which digitally coded information is arranged to be transmitted in burst mode between a subscriber's station and a local exchange by way of the subscriber's line, there are provided means at the subscriber's station and at the local exchange arranged selectively to transmit and receive longer bursts in one direction than the other, during each of a succession of frame periods, in dependence upon the information to be transmitted.

A line transmission system in accordance with the present invention will now be described by way of example with reference to the accompanying drawings, of which:

Figure 1:
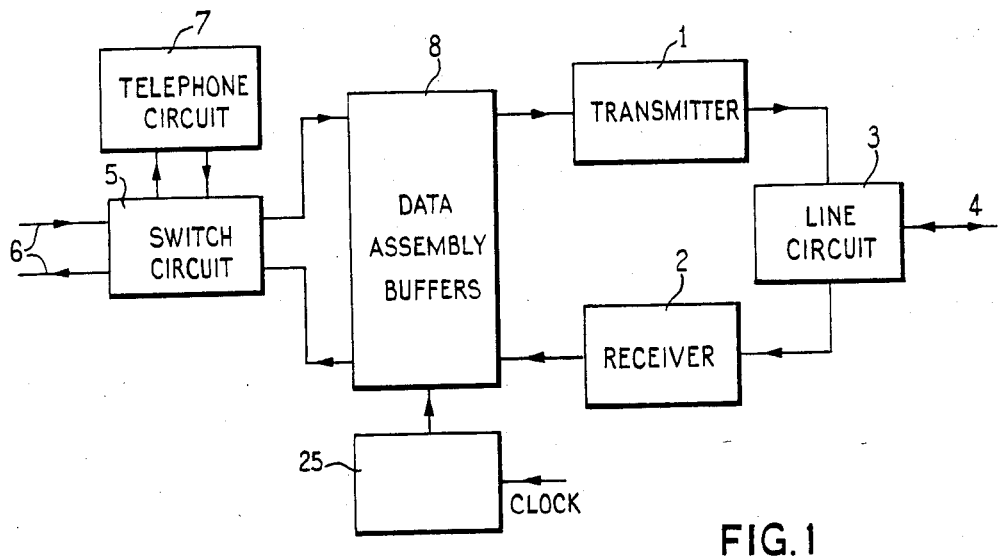
FIG. 1 shows schematically part of the equipment at one station of the system.

Referring first to FIG. 1 subscriber's equipment for connection to an exchange (not shown) of a digital telephone network comprises a transmitter 1 and a receiver 2 arranged to operate in burst mode, in conjunction with corresponding circuits (not shown) at the exchange, to transmit and receive in turn sequences or bursts of pulses representing bit values of binary coded information. The bursts of pulses are arranged to be transmitted and received by way of line circuits 3 and a telephone line pair 4, during each of a succession of time intervals or frame periods of, say, one millisecond duration. Each burst of pulses would normally represent some eighty bits plus a header, comprising sixteen bits of signalling information and eight groups of eight bits assembled from two 64 Kbit/sec speech channels, one 64 Kbit/sec speech channel and 64 Kbit/sec of data, or 128 Kbit/sec of data. One such burst would be transmitted and received during each frame period at a line rate of say, 320 Kbaud for two level signalling or 192 Kbaud for four-level signalling.

The coded information may be routed by a switch circuit 5 wither to and from a data path 6 or a telephone circuit 7, the bit values being assembled for transmission and held before distribution in a buffer circuit arrangement 8.

Figure 3:
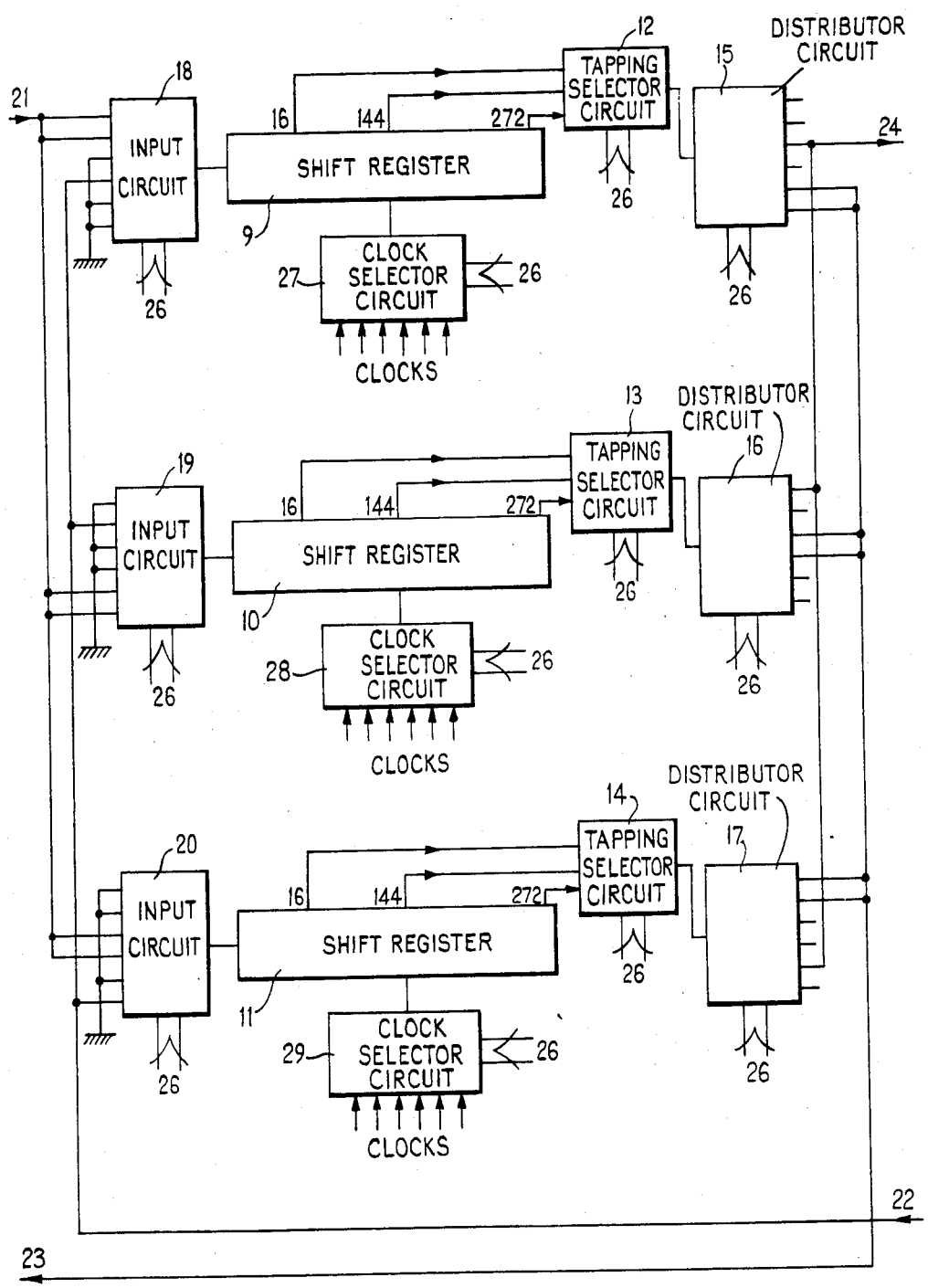

Referring now to FIG. 3 the arrangement 8 comprises three shift-register type buffers 9, 10 and 11 each capable of holding up to 272 bit values either in a single sequence, for two-level signalling, or in two sequences, for example in two registers in parallel, for four-level signalling. The buffers 9, 10 and 11, shown as single registers, are tapped at 16, 144 and 272 stages from their input ends, one or other of these tappings on each register, as required, being selected by a respective selector circuit 12, 13 or 14 for connection to a respective distributor circuit 15, 16 or 17.

Bit values are arranged to be applied to the inputs of the respective buffers 9, 10 and 11 by way of respective input circuits 18, 19 and 20 either from the switch circuit 5 (FIG. 1) over a path 21 or from the receiver 2 (FIG. 1) over a path 22. Bit values from the buffers 9, 10 and 11 are passed either to the switch circuit 5 by way of a path 23 or to the transmitter 1 (FIG. 1) by way of a path 24. The inputs 18, 19 and 20, the selector circuits 12, 13 and 14 and the distributor circuits 15, 16 and 17 are all stepped in unison through a six-step cycle taking up three successive frame periods by means of a cyclic three bit code group applied by a control circuit 25 by way of paths 26.

Figure 2:
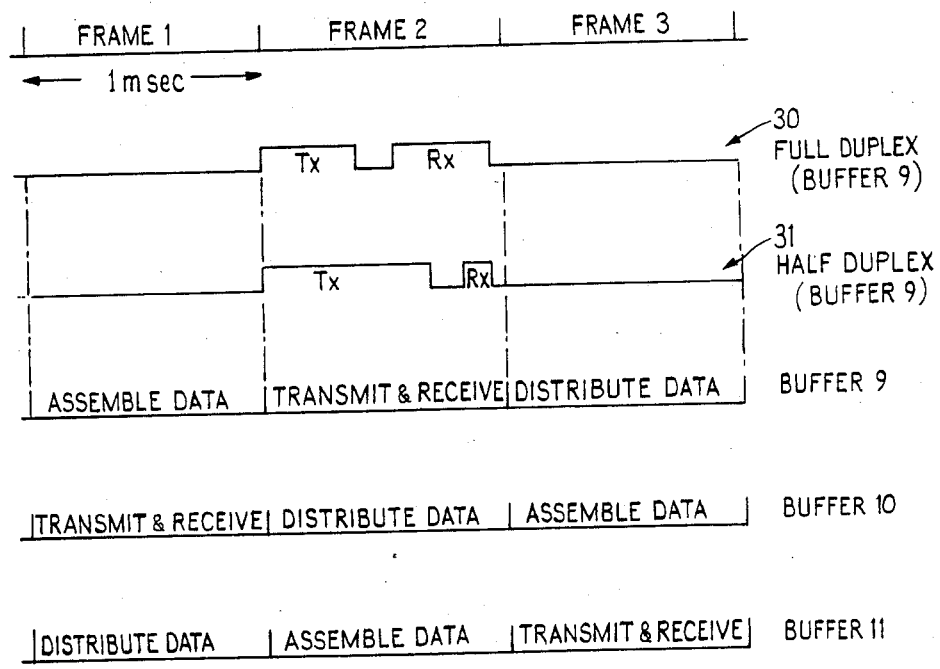
FIG. 2 shows diagrammatically timing sequences illustrating the operation of part of the equipment shown in FIG. 1, and FIG. 3 sshows in greater detail a part of the equipment shown in FIG. 1.

Referring now to FIG. 2 the buffers 9, 11 and 10 operate in turn ip that order to assemble coded speech or data bits generated during a respective frame period, for transmission during the first part of the following frame period. Taking the buffer 9 as an example coded speech or data bits are received during the second part of the second frame period and are distributed during the third frame period, either to the data path 6 or the telephone circuit 7 or both as required.

The clock inputs for the buffers 9, 10 and 11 are selected, in accordance with the three-bit cyclic code referred to above, by respective clock selector circuits 27, 28 and 29.

As described above the two 64 Kbit/sec channels plus 16 Kbit/sec of signalling in each direction over the line pair 4, in equal-length bursts of 144 bits, is indicated at 30 in FIG. 2 as full-duplex operation in respect of buffer 9. This mode could provide for example a two-way speech channel together with a capacity for up to 64 Kbit/sec of data in each direction between the subscriber's equipment and the exchange. In this mode it will be appreciated that the buffers need only to be 144 stages in length, since each burst to be transmitted can be assembled in the first 144 stages while a received burst can also be held in these same 144 stages. The selector circuits 12, 13 and 14 are arranged accordingly to select the respective 144 stage taps.

When it is desired to utilise the maximum capacity of the line pair link between the subscriber's equipment and the exchange for the transmission of digital information in one direction only or in the other direction only, while still operating in burst mode, the buffers 9, 10 and 11 and the selector circuits 12, 13 and 14 may be arranged to assemble or receive, as required, up to 256 bits of data and 16 bits of signalling at a time in one direction and only 16 bits of signalling in the other direction. This mode of operation, indicated at 31 in FIG. 2 as half-duplex operation inrespect of the buffer 9, enables the subscriber's equipment to transmit or to receive data at up to 256 Kbit/sec. It will be appreciated that in this mode, at an appropriate time during the three frame cycle, the selector circuits 12, 13 and 14 will be required to select alternately the 16 stage and the 272 stage taps on the respective buffers 9, 10 and 11.

We claim:

1. A line transmission system for the transmission of signals in digitized form in burst mode between two stations of the system with each of said two stations in turn transmitting a sequence of signals in digitized form to the other of said two stations over a common transmission path during each of a succession of frame periods, comprising at each of said two stations buffer storage means for holding a plurality of signal bit values, means for transmitting and for receiving over said common path signals in digitized form representing signal bit values, means for applying sequences selectively of different numbers of signal bit values from said buffer storage means to said means for transmitting signals in digitized form, and means for applying sequences selectively of different numbers of signal bit values to said buffer storage means from said means for receiving signals in digitized form selectively to enable the transmission of longer sequences in one direction than the other between said two stations, the buffer storage means at at least one of said two stations comprising three buffers which are utilized in turn in successive frame periods in the assembly of signal bit values for transmission, in the transmission and receipt of signal bit values over said common path and in the distribution of said signal bit values.

2. A line transmission system in accordance with claim 1, wherein there are provided telephone circuit means providing some at least of said signal bit values representing pulse-coded speech samples.

* * * * *